(12) United States Patent
Chien

(10) Patent No.: US 8,054,644 B2
(45) Date of Patent: Nov. 8, 2011

(54) KEY MECHANISM FOR PORTABLE ELECTRONIC DEVICE

(75) Inventor: Ting-Chun Chien, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 541 days.

(21) Appl. No.: 12/345,379

(22) Filed: Dec. 29, 2008

(65) Prior Publication Data

US 2009/0303688 A1    Dec. 10, 2009

(30) Foreign Application Priority Data

Jun. 4, 2008    (CN) .......................... 2008 1 0301958

(51) Int. Cl.
*H05K 1/14* (2006.01)

(52) U.S. Cl. ......... 361/786; 361/759; 174/550; 174/560

(58) Field of Classification Search .................. 361/759, 361/748, 749, 752, 785, 786; 174/541–543, 174/550, 559–563; 439/816
See application file for complete search history.

(56) References Cited

U.S. PATENT DOCUMENTS

| | | | |
|---|---|---|---|
| 2004/0240162 A1* | 12/2004 | Hsu et al. ........................ | 361/680 |
| 2008/0131184 A1* | 6/2008 | Brown et al. .................. | 400/490 |
| 2008/0264768 A1* | 10/2008 | Shi et al. ...................... | 200/344 |

* cited by examiner

*Primary Examiner* — Dameon Levi
*Assistant Examiner* — Hoa C Nguyen
(74) *Attorney, Agent, or Firm* — Altis Law Group, Inc.

(57) ABSTRACT

A key mechanism includes a key body, a circuit board, and a elastic metal frame. The elastic metal frame comprising a main body, a first latching portion, and a second latching portion. The first latching portion and the second latching portion protrude from the main body. The main body is positioned between the key body and the circuit board. The elastic metal frame supporting the circuit board by the first latching portion and the second latching portion.

12 Claims, 5 Drawing Sheets

KEY MECHANISM FOR PORTABLE ELECTRONIC DEVICE

BACKGROUND

1. Technical Field

The exemplary disclosure relates to key mechanisms and, particularly, key mechanisms for portable electronic devices.

2. Description of Related Art

Key assemblies of portable electronic devices, such as mobile phones, are usually formed on the outer sidewalls of the housings.

FIG. 5 shows a typical portable electronic device 50 including a key body 52, a first circuit board 56, an elastic metal frame 54 adhered to the first circuit board 56 by adhesive 58, and a main board 57 connected to the first circuit board 56 by a second circuit board 59. The second circuit 59 board may be a flexible printed circuit board. The first circuit board 56 has a first switch 562 and a second switch 564. By pressing the key body 52, the elastic metal frame 54 deforms to electrically connect the first switch 562 and the second switch 564.

However, the adhesive 58 may fail resulting in separation of the elastic metal frame 54 from the first circuit board 56. Thus, a gap (not shown) between the elastic metal frame 54 and the first circuit board 56 can appear. Since the key body 52 is typically made of metal material, static electricity is often generated. The static electricity may transmit to the first circuit board 56 through the gap, and then to the main board 57. Electronic components disposed on the main board 57 may be damaged from the static electricity.

Therefore, there is room for improvement within the art.

BRIEF DESCRIPTION OF THE DRAWINGS

Many aspects of the exemplary key mechanism and the portable electronic device using the key mechanism can be better understood with reference to the following drawings. These drawings are not necessarily drawn to scale, the emphasis instead being placed upon clearly illustrating the principles of the exemplary key mechanism. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
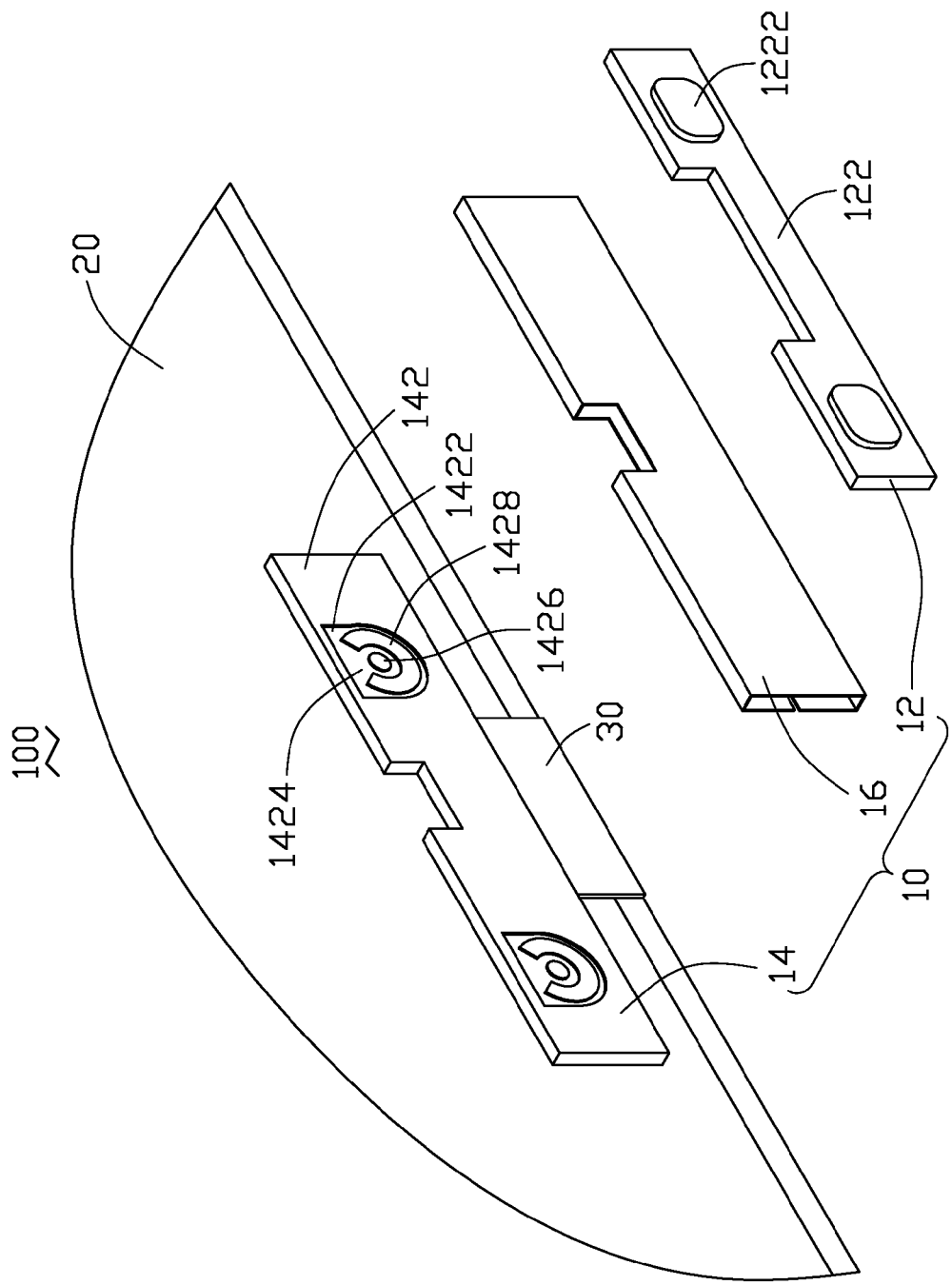
FIG. 1 is an exploded and partial view of a portable electronic device using a key mechanism according to an exemplary embodiment.

FIG. 1 shows a portable electronic device 100 (such as a mobile phone) including a key mechanism 10, a main board 20, and a flexible printed circuit board 30. The key mechanism 10 electrically connects with the main board 20 by the flexible printed circuit board 30. The key mechanism 10 includes a key body 12, a circuit board 14, and an elastic metal frame 16.

Figure 2:
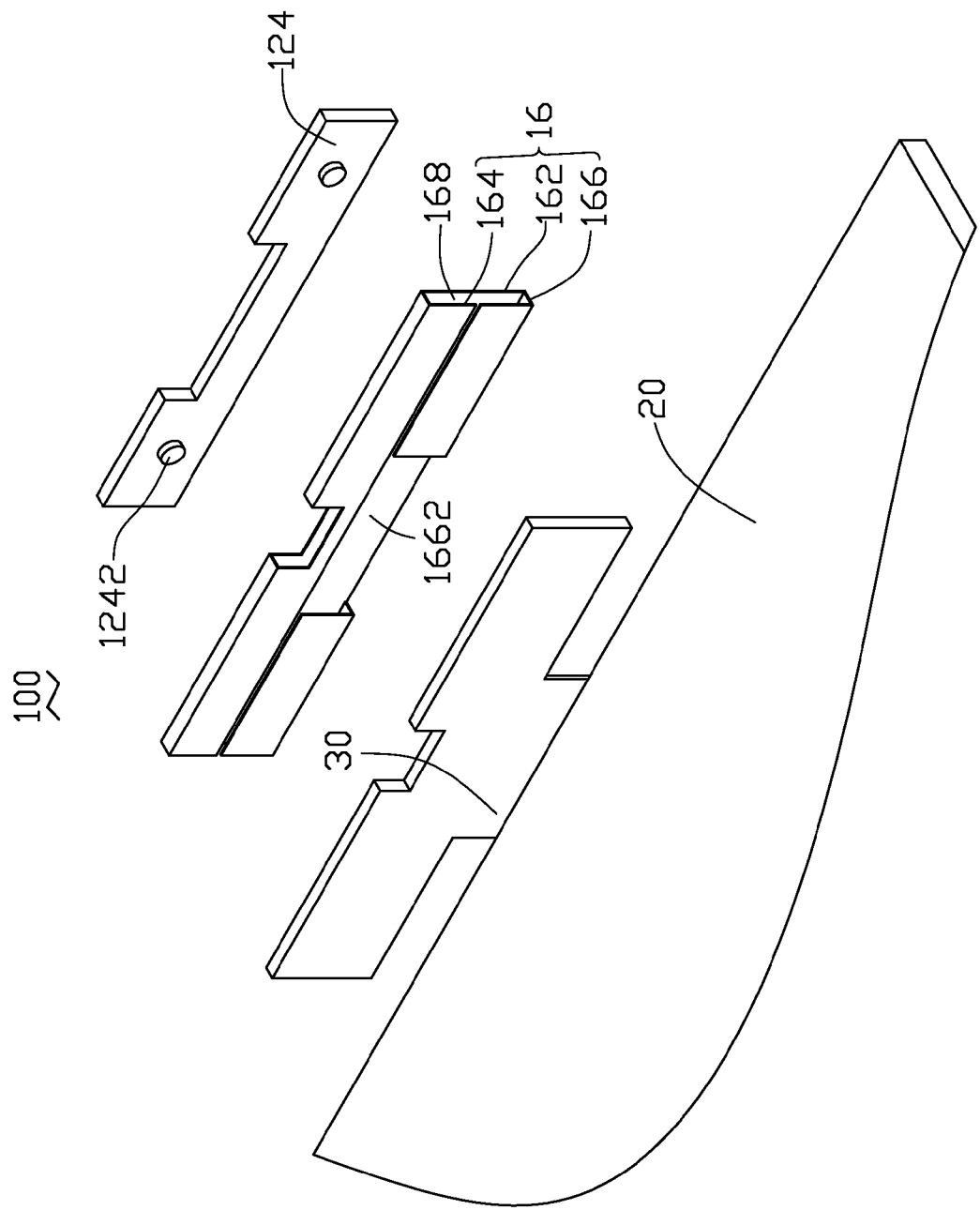
FIG. 2 is an exploded view of the portable electronic device in FIG. 1, showing another aspect.

Referring to FIGS. 1 and 2, the key body 12 includes a front surface 122 and a rear surface 124. The front surface 122 has two outwardly protruding pressing portions 1222. The rear surface 124 faces the circuit board 14 and has two triggering portions 1242 corresponding in position to the pressing portions 1222.

The circuit board 14 is generally rectangular and has a first surface 142 facing the key body 12. The first surface 142 has two grooves 1422 defined therein and two surfaces 1424 formed in the two grooves 1422. Each surface 1424 has a first switch 1426 and a second switch 1428 spaced from the first switch 1426. The first switch 1426 and the second switch 1428 correspond to the triggering portions 1242.

Figure 3:
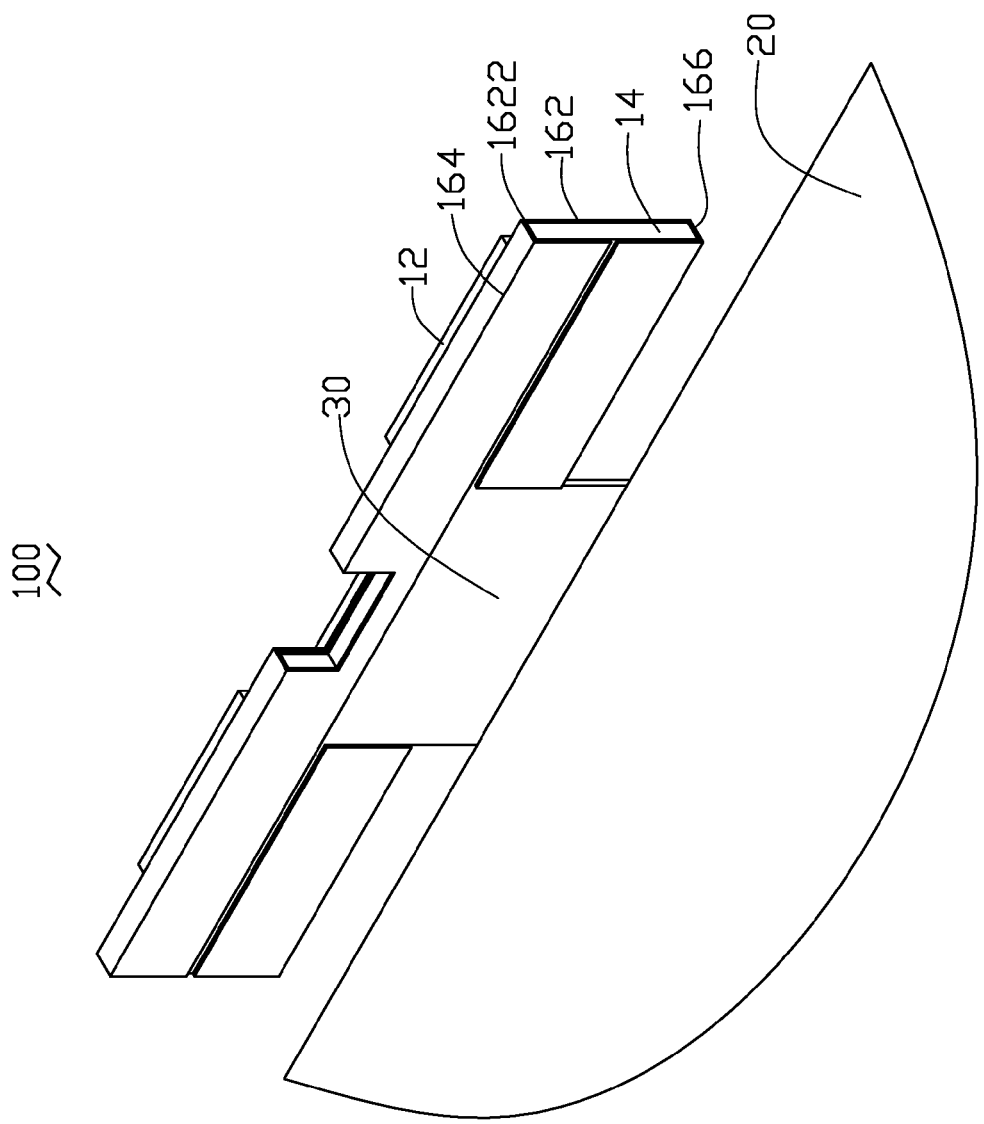
FIG. 3 is an assembled view of the portable electronic device in FIG. 1.
Figure 4:
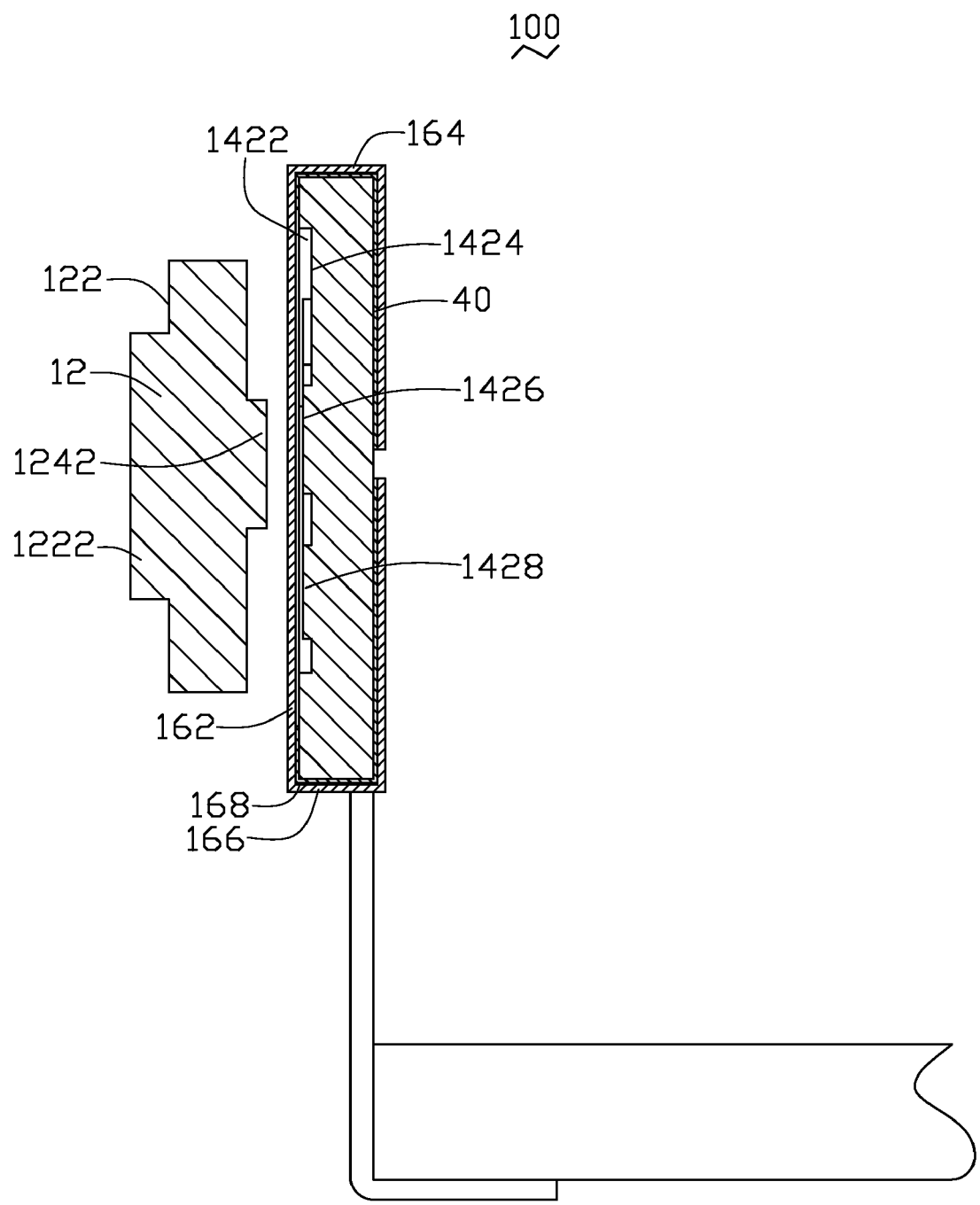
FIG. 4 is an enlarged and cross-sectional view of the portable electronic device in FIG. 3.
Figure 5:
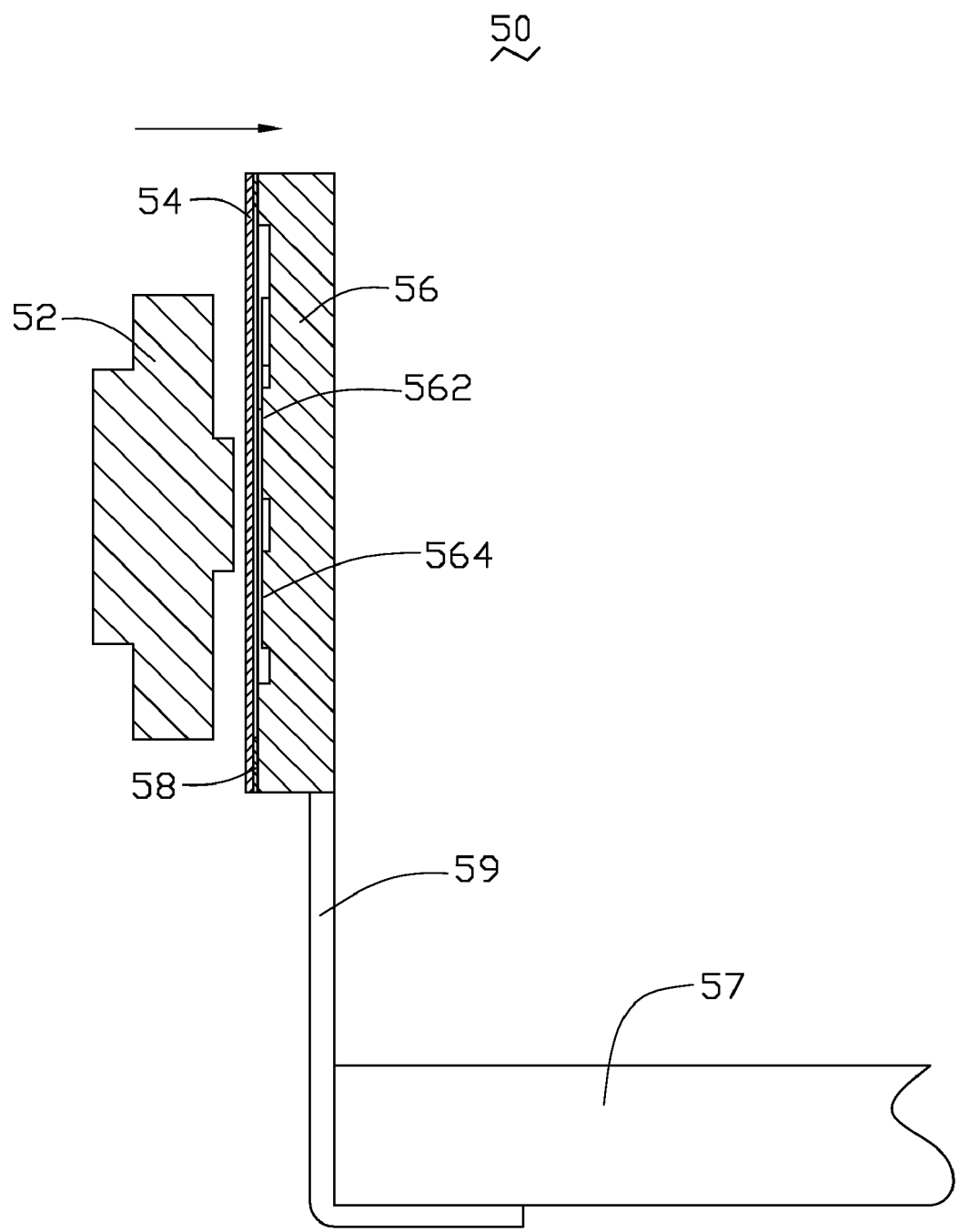
FIG. 5 is a cross-sectional, partial view of a typical portable electronic device.

Referring to FIG. 2, the elastic metal frame 16 includes a main body 162, a first latching portion 164, and a second latching portion 166 opposite to the first latching portion 164. The key body is attached to the main body 162 e.g., by holt melt while the circuit board 14 is contained within and supported by frame 16. The main body 162 is positioned between the key body 12 and the circuit board 14. The main body 162 has two opposite edges 1622 (shown in FIG. 3). The first latching portion 164 and the second latching portion 166 have L-shaped cross-sections, respectively protrude from the two opposite edges 1622, and are perpendicular to the main body 162. The main body 162, the first latching portion 164, and the second latching portion 166 define a chamber 168 for accommodating the circuit board 14. When the circuit board 14 is accommodated in the chamber 168, an adhesive 40 (show in FIG. 4) adheres the circuit board 14 to the first latching portion 164 and the second latching portion 166. The second latching portion 166 defines a notch 1662 corresponding to the flexible printed circuit board 30. The flexible printed circuit board 30 passes through the notch 1662 into the chamber 168 for connecting with the circuit board 14 (show in FIG. 3).

The elastic metal frame 16 can stably support the circuit board 14 by the first latching portion 164 and the second latching portion 166. The first latching portion 164 and the second latching portion 166 can also be stably adhered to the circuit board 14 by adhesive 40, thereby avoiding a gap between the elastic metal frame 16 and the circuit board 14. Pressing the pressing portions 1222 result in the corresponding triggering portion 1242 deflecting the elastic frame 16 and actuate the associated first switch 1426 and second switch 1428.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A key mechanism for portable electronic device, comprising:
    a key body;
    a circuit board; and
    an elastic metal frame comprising a main body, a first latching portion, and a second latching portion, the first latching portion and the second latching portion protruding from the main body, the main body being positioned between the key body and the circuit board, the elastic metal frame supporting the circuit board by the first latching portion and the second latching portion.

2. The key mechanism as claimed in claim 1, wherein the main body has two opposite edges, the first latching portions protruding from the opposite edges and in a direction perpendicular to the main body and the second latching portions protruding from the first latching portions in a direction parallel to the main body.

3. The key mechanism as claimed in claim 2, wherein the first latching portion is L-shaped.

4. The key mechanism as claimed in claim 2, wherein the second latching portion is L-shaped.

5. The key mechanism as claimed in claim 1, wherein the main body, the first latching portion, and the second latching portion cooperatively define a chamber for accommodating the circuit board.

6. The key mechanism as claimed in claim 1, wherein adhesive is used for adhering the circuit board to the first latching portion and the second latching portion.

7. A portable electronic device, comprising:
   a flexible printed circuit board;
   a main board; and
   a key mechanism including a key body, a circuit board, and a elastic metal frame;
   wherein the main board being connected with the circuit board by the flexible printed circuit board, the elastic metal frame comprising a main body, a first latching portion, and a second latching portion, the first latching portion and the second latching portion protruding from the main body, the main body being positioned between the key body and the circuit board, the elastic metal frame supporting the circuit board by the first latching portion and the second latching portion.

8. The key mechanism as claimed in claim 7, wherein the main body has two opposite edges, the first latching portions protruding from the opposite edges and in a direction perpendicular to the main body and the second latching portions protruding from the first latching portions in a direction parallel to the main body.

9. The key mechanism as claimed in claim 8, wherein the first latching portion is L-shaped.

10. The key mechanism as claimed in claim 8, wherein the second latching portion is L-shaped.

11. The key mechanism as claimed in claim 7, wherein the main body, the first latching portion, and the second latching portion defines a chamber for accommodating the circuit board.

12. The key mechanism as claimed in claim 7, wherein an adhesive is used for adhering the circuit board to the first latching portion and the second latching portion.

* * * * *